US011605403B2

(12) United States Patent
Iyer et al.

(10) Patent No.: US 11,605,403 B2
(45) Date of Patent: Mar. 14, 2023

(54) TIME COMPRESSING VIDEO CONTENT

(71) Applicant: Freewheel Media, Inc., Philadelphia, PA (US)

(72) Inventors: Bala Iyer, Montville, NJ (US); Alex Jansen, Jersey City, NJ (US); Gerrit Niemeijer, Maplewood, NJ (US); Seth Haberman, New York, NY (US)

(73) Assignee: FreeWheel Media, Inc., Philadelphia, PA (US)

( * ) Notice: Subject to any disclaimer, the term of this patent is extended or adjusted under 35 U.S.C. 154(b) by 0 days.

(21) Appl. No.: 17/503,979

(22) Filed: Oct. 18, 2021

(65) Prior Publication Data
US 2022/0036925 A1    Feb. 3, 2022

Related U.S. Application Data

(63) Continuation of application No. 16/820,596, filed on Mar. 16, 2020, now Pat. No. 11,152,033, which is a continuation of application No. 14/824,807, filed on Aug. 12, 2015, now Pat. No. 10,629,241, which is a
(Continued)

(51) Int. Cl.
| | |
|---|---|
| *G11B 27/28* | (2006.01) |
| *G11B 27/031* | (2006.01) |
| *G11B 27/34* | (2006.01) |
| *G11B 27/034* | (2006.01) |

(Continued)

(52) U.S. Cl.
CPC ............ *G11B 27/28* (2013.01); *G11B 27/031* (2013.01); *G11B 27/034* (2013.01); *G11B 27/34* (2013.01); *H04N 5/147* (2013.01); *H04N 7/0115* (2013.01)

(58) Field of Classification Search
None
See application file for complete search history.

(56) References Cited

U.S. PATENT DOCUMENTS

| | | |
|---|---|---|
| 5,317,398 A | 5/1994 | Casavant et al. |
| 5,881,202 A | 3/1999 | Herz |
| 5,995,153 A | 11/1999 | Moeller et al. |

(Continued)

FOREIGN PATENT DOCUMENTS

| | | |
|---|---|---|
| EP | 1585339 A2 | 10/2005 |
| GB | 2312116 A | 10/1997 |
| WO | 2005/050978 A1 | 6/2005 |

OTHER PUBLICATIONS

Canadian Examination Report, dated Mar. 23, 2016, from related Canadian Patent Application No. 2,766,936.
(Continued)

*Primary Examiner* — Edemio Navas, Jr.
(74) *Attorney, Agent, or Firm* — BakerHostetler (57) ABSTRACT

Methods and systems for compressing video content are presented. The methods and systems include analyzing a sequence of media frames stored in the memory device and calculating a displacement level of each of the media frames. The displacement level indicates how different each of the media frames is to a previous media frame. The sequence of media frames is divided into a plurality of cuts where each cut ends at a media frame having a substantially high displacement level. Frames to be removed from the sequence of media frames are identified in each cut based upon the frame's displacement level. The identified frames are then removed.

20 Claims, 7 Drawing Sheets

Related U.S. Application Data continuation of application No. 12/823,806, filed on Jun. 25, 2010, now Pat. No. 9,129,655.

(60) Provisional application No. 61/220,461, filed on Jun. 25, 2009.

(51) Int. Cl.
*H04N 5/14* (2006.01)
*H04N 7/01* (2006.01)

(56) References Cited

U.S. PATENT DOCUMENTS

| | | | |
|---|---|---|---|
| 6,356,664 | B1 | 3/2002 | Dunn et al. |
| 6,671,323 | B1 | 12/2003 | Tahara et al. |
| 10,629,241 | B2 | 4/2020 | Iyer et al. |
| 2002/0061067 | A1* | 5/2002 | Lyons .............. H04N 21/23406 375/E7.022 |
| 2002/0080286 | A1 | 6/2002 | Dagtas et al. |
| 2004/0001544 | A1 | 1/2004 | Mehrotra |
| 2004/0170392 | A1 | 9/2004 | Lu et al. |
| 2004/0207751 | A1 | 10/2004 | White et al. |
| 2004/0227852 | A1 | 11/2004 | Neuman et al. |
| 2005/0110875 | A1 | 5/2005 | Ma et al. |
| 2008/0063287 | A1* | 3/2008 | Klamer ................ G11B 27/329 382/232 |
| 2008/0240489 | A1 | 10/2008 | Marugame |
| 2009/0083781 | A1 | 3/2009 | Yang et al. |
| 2010/0037059 | A1 | 2/2010 | Sun et al. |
| 2010/0128171 | A1 | 5/2010 | Yasuoka et al. |
| 2010/0271393 | A1 | 10/2010 | Forutanpour et al. |

OTHER PUBLICATIONS

Extended European Search Report, dated Mar. 2, 2015, from corresponding European Patent Application No. EP10792735.2 (6 pgs).
PCT/US10/40019, International Search Report dated Aug. 16, 2010.
US Patent Application filed on Mar. 16, 2020, entitled "Time Compressing Video Content", U.S. Appl. No. 16/820,596.

* cited by examiner

TIME COMPRESSING VIDEO CONTENT

CROSS-REFERENCE TO RELATED APPLICATIONS

This application is a continuation of U.S. patent application Ser. No. 16/820,596, filed Mar. 16, 2020, which is a continuation of U.S. patent application Ser. No. 14/824,807, filed Aug. 12, 2015, now U.S. Pat. No. 10,629,241, issued on Apr. 21, 2020, which is a continuation of U.S. patent application Ser. No. 12/823,806, filed Jun. 25, 2010, now U.S. Pat. No. 9,129,655, issued on Sep. 8, 2015, which claims the benefit of U.S. Patent Application No. 61/220,461, filed Jun. 25, 2009, each of which is hereby incorporated by reference in their entirety.

FIELD OF INVENTION

The invention generally relates to video processing, and more specifically to time compression of video content and programming.

BACKGROUND

Time compressing video content involves making the video content presentable to the viewer in a timescale that is different from the timescale of the original video content. Automatic time compression of video content is useful in a variety of different situations, for example to fit thirty second television commercials into twenty-eight seconds available for addressable commercials, or more generally to fit video content into smaller intervals to create room for visual effects.

Traditional compression, whether based in audio or video, includes removing small bits of information that will be undetectable to a viewer's eye or listener's ear. In an audio context, information and data relating to frequencies inaudible by the human ear may be removed to shrink the size of the audio file. When the audio is replayed, a typical listener does not notice the missing frequencies because she would not have been able to detect it even if it were still there.

The removal of information from a video stream presents unique problems. Time compressing a video traditionally involves removing pieces or video from a sequence in order to shorten the length to a desired length. Time-compression of video is difficult because of the high sensitivity of the human eye and its ability to notice the smallest discrepancies or discontinuities in a video sequence. Even if the viewer is unaware of the removal of some parts of the video, the video may still blur, become choppy, or contain visible static. When watching time-compressed video, the quality of the viewer experience is dependent on the minimized discontinuities in the viewer-perceived flow of time, which depends on the extent of displacement of visible objects in either their three-dimensional position or in their color space. The more drastic the displacement, the higher the level of viewer-perceived discontinuity will be.

What is needed therefore is a system and method of time-compressing media while minimizing the viewer-perceived discontinuity.

SUMMARY

Example embodiments of the present invention provide systems and methods for time compressing video content. Embodiments will take video content that has a certain duration, and time compress it to fit into another (smaller) time duration, while minimizing any disruption in the user experience. Some example embodiments may time compress addressable television commercials, for example a TV commercial that was originally produced to be 30 or 60 seconds, now has to be "fit" into a time slot of 28 or 58 seconds.

Rather than producing a totally new (28/58 second) commercial, the example embodiments described will automatically time compress the commercial to fit into the desired time space. It is noted that the present invention is not limited to use with TV commercials only, or to television or film video formats. Rather, example embodiments may be used in any situation where video or other media content needs to be time compressed to fit into a smaller time interval.

One embodiment of the invention includes a computer-implemented method for compressing media content. The computer includes a processor, a memory device and control logic. The method includes analyzing a sequence of media frames stored in the memory device and calculating a displacement level of each of the media frames. The displacement level indicates how different each of the media frames is to a previous media frame. The sequence of media frames is divided into a plurality of cuts where each cut ends at a media frame having a substantially high displacement level. Frames to be removed from the sequence of media frames are identified in each cut based upon the frame's displacement level. The identified frames are then removed.

Another embodiment of the invention includes a system for time compressing media. The system includes an input device configured to receive a media sequence and a target length for the media sequence, a storage device configured to store the media sequence and a processor in communication with the storage device configured to process the media sequence. A cut detection component is configured to divide the media sequence into a plurality of cuts. Each cut ends at a media frame having a substantially high displacement value. The media sequence is fed to the cut detection component by the processor. A compression component is configured to identify and remove frames from the media sequence if the media sequence exceeds the target length, the processor feeding the media sequence from the cut detection component to the compression component.

Yet another embodiment of the invention includes a computer program product comprising a computer usable medium having control logic stored therein causing the computer to optimize the targeting of media. The control logic comprises a first computer readable program code means for causing the computer to analyze a sequence of media frames stored in the memory device and a second computer readable program code means for causing the computer to calculate a displacement level of each of the media frames. The displacement value indicates how different each of the media frames is to a previous media frame. A third computer readable program code means is included for causing the computer to divide the sequence of media frames into a plurality of cuts, where each cut ends at a media frame having a substantially high displacement value. A fourth computer readable program code means causes the computer to identify in a first cut frames to be removed from the sequence of media frames. The frames to be removed are identified based upon the frame's displacement value. A fifth computer readable program code means causes the computer to remove by the processor the frames to be removed.

BRIEF DESCRIPTION OF THE DRAWINGS

The present invention will be more readily understood from a detailed description of example embodiments taken in conjunction with the following figures.

DETAILED DESCRIPTION OF EXAMPLE EMBODIMENTS

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously.

Example embodiments of the present invention may include systems and procedures which are capable of time compressing video. Such embodiments may apply to digitized video encoded as a sequence of frames, where the number of frames in a sequence is always a whole number. For example, a digital video sequence may be encoded according to an MPEG standard, or any other acceptable video standard. Each frame in such a sequence consists of two fields: the odd field, consisting of scan lines 1,3,5, etc., and the even field, consisting of scan lines 0,2,4, etc. Example embodiments may time compress video content by reducing the number of frames in such a sequence.

Some example embodiments of the present invention may provide procedures for time compressing video, in order to reduce the duration of the video segment to match a target length or duration. Such procedures may time compress a video segment by removing a number of frames contained in the video segment. It is noted that video is typically played at a fixed frame rate. Accordingly, reducing the length of the video, i.e., the number of frames, in effect reduces the duration of the video. In what follows, time compression of video is described in terms of reducing a video segment of a certain length to a target length.

According to one embodiment a compression procedure may begin by receiving a video sequence V, consisting of a set of frames F, where n equals the number of frames (and therefore also equals the length of V):

$$V = \{F_1, F_2, F_3 \ldots F_n\}, \text{ where } \text{len}(V) = n$$

Such an example embodiment may time compress the sequence to a new sequence $V_{reduc}$, where $V_{reduc}$ is shorter than V, but the user-perceived content is the same, and there are minimal or no user-perceived artifacts or displacements:

$$V_{reduc} = \{F'_1, F'_2, F'_3 \ldots F'_m\}, \text{ where } \text{len}(V_{reduc}) = m, \text{ and } m < n$$

To do so, the video sequence may be divided into cuts or scenes. In this way, the original sequence of frames may be organized into scenes or cuts C, each of which may represent a sequence of frames from the original material that the video sequence was composed from:

$$V = \{C_1, C_2, C_3, \ldots C_x\}, \text{ where } C_1 = \{F_1 \ldots F_{c1}\}, C_2 = \{F_{c1+1} \ldots F_{c2}\},$$

Figure 1:
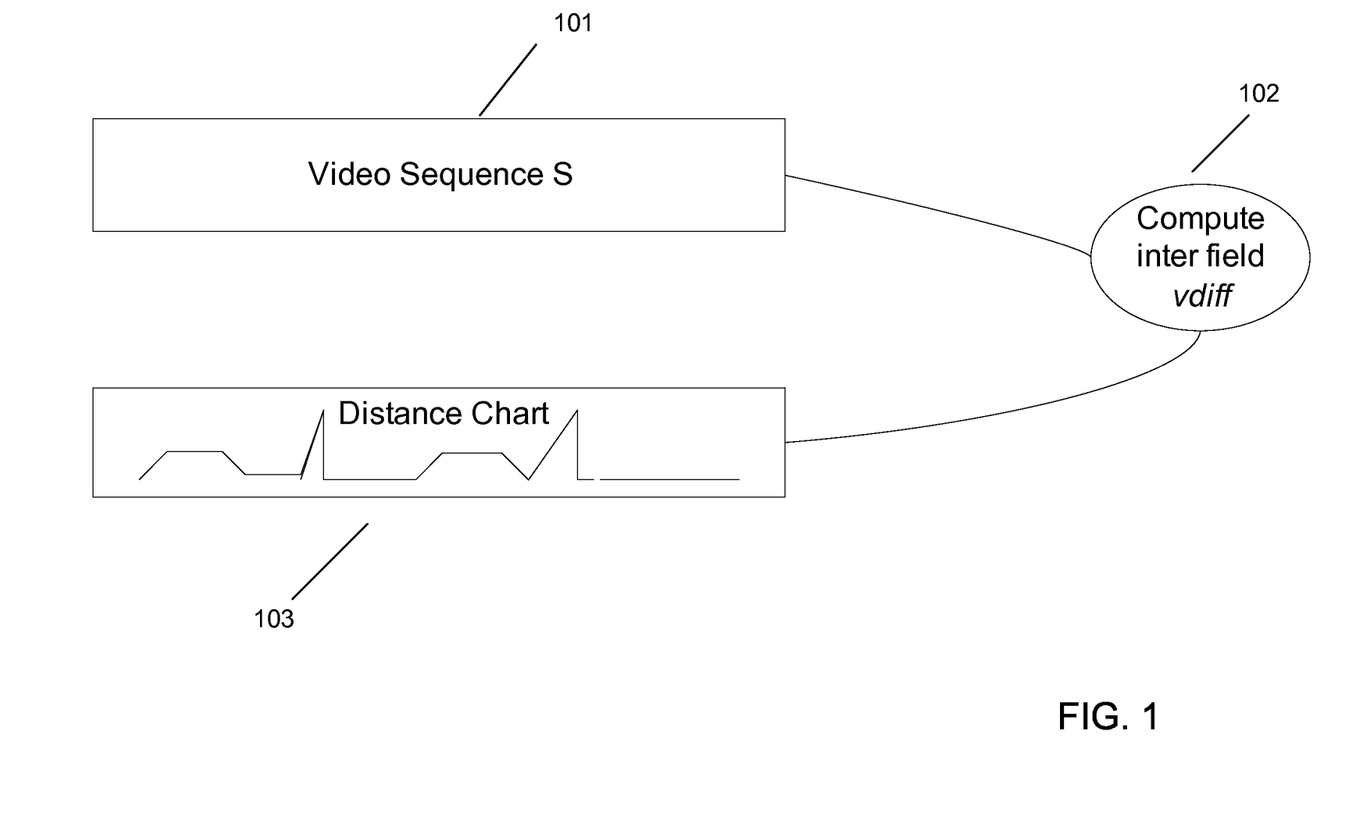
FIG. 1 illustrates an example procedure in accordance with an example embodiment of the present invention.

Scene-cut detection may be performed using a variety of image processing algorithms. In an example embodiment, the displacement between subsequent video frames and fields may be calculated. For instance, in such an embodiment, a number may be computed for each frame or field in the video sequence. The number (here called vdiff) may indicate the level of displacement, or a displacement value, of the current frame or field when compared to the preceding frame or field. Such a number would indicate how different the current frame or field is in relation to the previous one. For example, the range of vdiff could be 0.0 to 1.0, where 0.0 indicates no difference between frames or fields, and 1.0 indicates complete difference (as between a completely black and a completely white frame). For instance, as illustrated in FIG. 1, an example procedure may calculate a displacement value 102 for each frame or field in a video sequence 101, resulting in a set of displacement values which may be represented as a distance chart 103.

Figure 2:
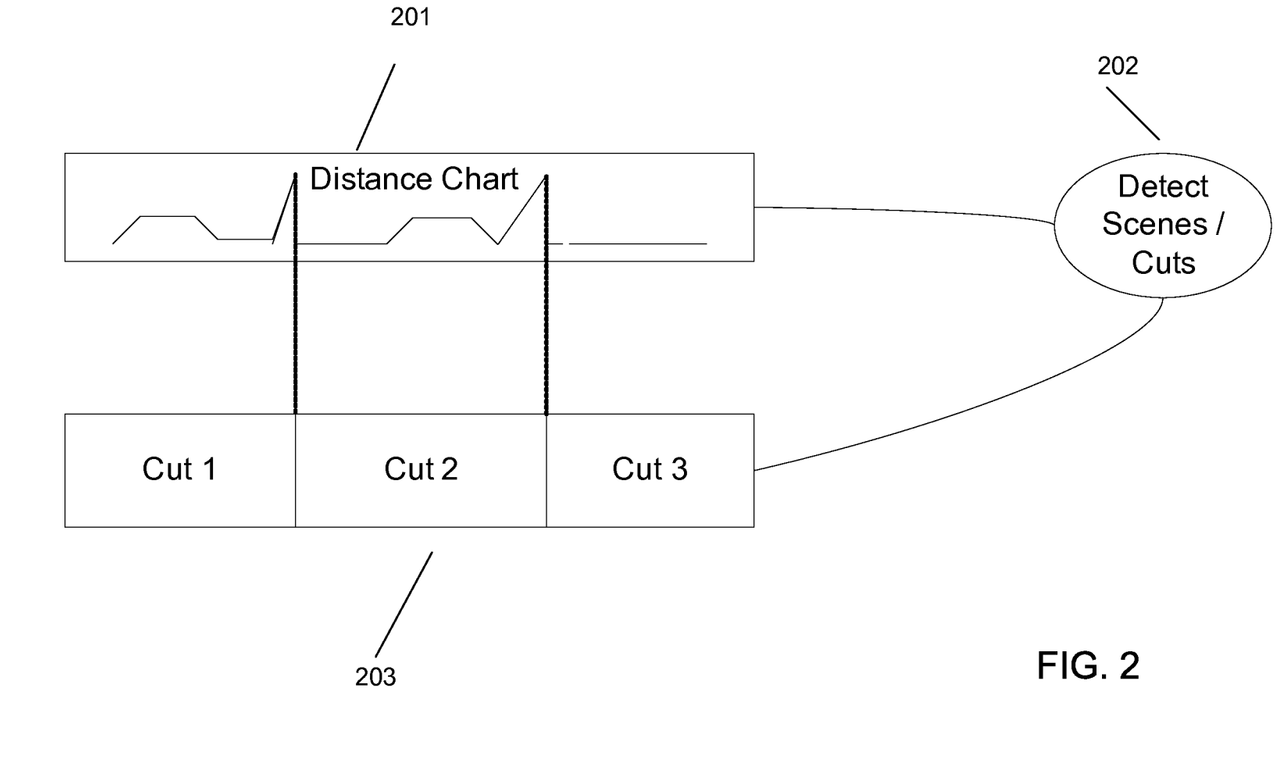
FIG. 2 illustrates an example procedure in accordance with an example embodiment of the present invention.

The example procedure may then use the distance map to do scene cut detection, and to decompose the video sequence into a sequence of cuts. For instance, as illustrated in FIG. 2 the video segment may be divided into cuts at locations in the video segment where the calculated displacement is very large, as large displacements may indicate a scene change. Thus, FIG. 2 illustrates that the displacement values calculated for the sequence 201 may be used to detect scenes 202 and to divide the video sequence into multiple cuts 203.

Once the sequence is divided into cuts, the example process may identify pull-down patterns in each cut. Pull down patterns may exist in the video sequence if a "pull-down" conversion, a technique to transform a video created at one frame rate to another frame rate, has been applied to the video, as is often the case. For instance, video content is produced with different frame rates. For example, film content is typically shot at 24 frames-per-second (fps) while television content is typically created at 29.97 fps. Such content may, however, be converted between different frame rates as necessary. For example, a piece of film content produced at 24 fps may be transformed into a piece of video content at 29.97 fps. In such a case, the ratio between the two frame rates is 24:29.97≈4:5, which means that for every four frames in the film content, five frames in the video content are needed. Accordingly, film content may be converted into video content using a process which essentially stretches four frames to five frames by using the fields in the original four frames to create an extra fifth frame every four frames. The process used to perform this commonly performed conversion is known as "2:3 pulldown."

For example, the original content may contain frames A, B, C, and D. Since every frame includes two fields (odd and even), the content can be represented as the following sequence of two-field frames: A1A2, B1B2, C1C2, D1D2. In such an example, the even fields of frame B may be combined with the odd fields of frame C to create an additional frame, which may be inserted into the sequence, transforming the original four frame sequence into the following five frame sequence: A1A2, B1B2, B2C1, C1C2, D1D2. The newly created five frame sequence may accordingly be used for TV/video content purposes. Although there are many different ways to combine the fields of the four frame sequence to produce the fifth frame, whichever pattern is chosen, it is repetitive and predictable.

Accordingly, example procedures may detect such patterns within the video sequence to be time-compressed. For example, each cut may be searched in sequence, determining for each cut scanned whether a pull-down pattern is detected within the cut. Note that pulldown algorithms are applied uniformly on source segments (i.e., when the original content shot on film is transferred to video). As each cut should represent a single scene, at most one pulldown pattern should be present within each cut. That is, for each cut either no pulldown will have been applied, or a single pulldown algorithm will have been applied, resulting in a single pulldown pattern present in the cut. If multiple pulldown patterns exist within a cut, then the cut may need to be divided into smaller cuts. Accordingly, an example process may subdivide such a cut again using the scene-cut detection techniques described above.

For every cut where a pulldown pattern is detected, a reverse pulldown procedure may then be executed. Application of such a procedure may restore the cut to its state before the pulldown was originally applied. As a result the extra frames created during the pulldown process will be removed from the cut, reducing the total number of frames present in the cut and in the video segment as a whole. For example, applying such a procedure to a cut on which 3:2 pulldown was applied, the number of frames in the cut would be reduced by a factor of 4/5. In addition, the content removed will have been artificially introduced in the first place. Accordingly, the time compression achieved will not create any distortions in the resulting video segment at all.

Figure 3:
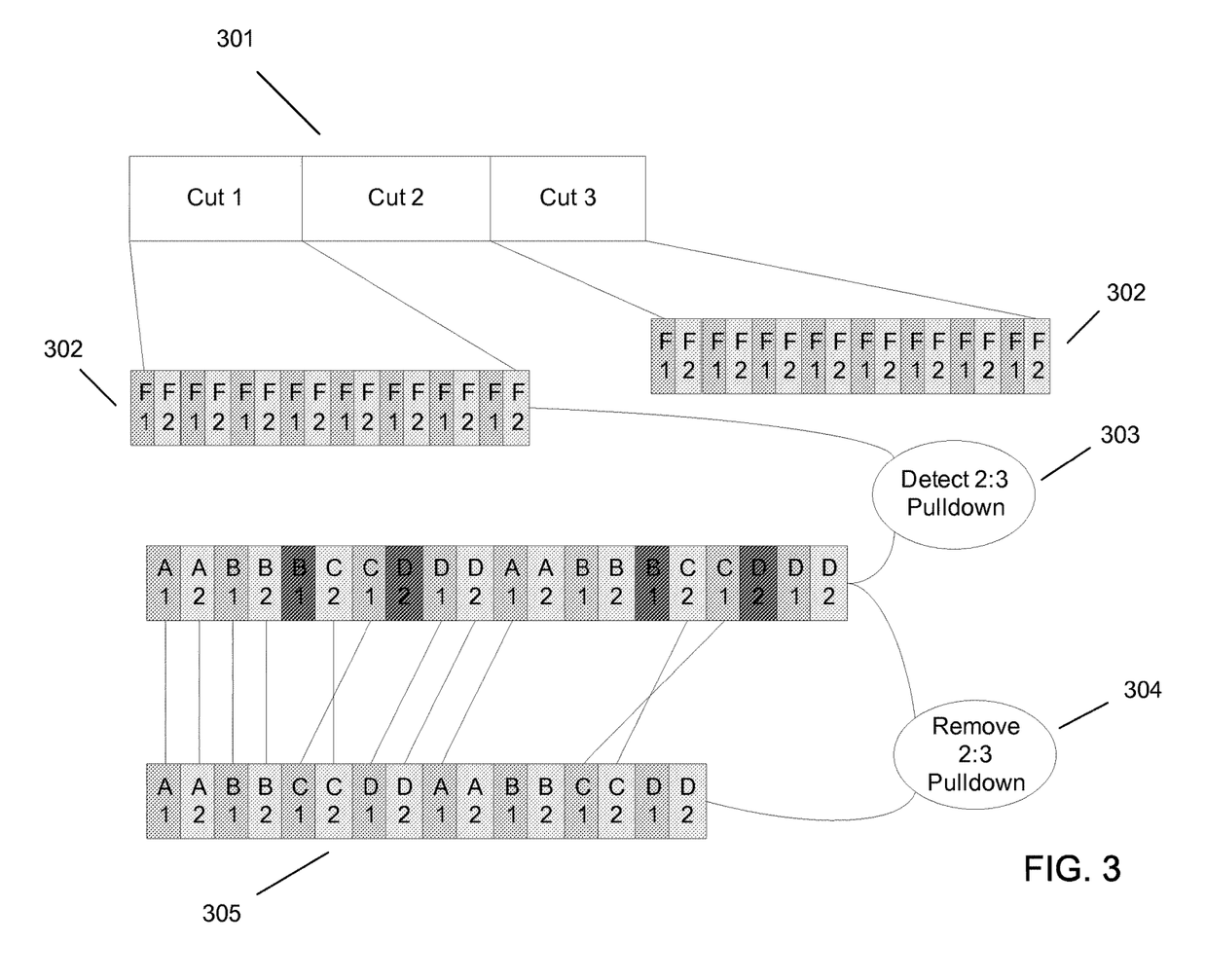
FIG. 3 illustrates an example procedure in accordance with an example embodiment of the present invention.

As an example of one embodiment, FIG. 3 illustrates a video sequence which has been divided into a number of cuts 301. Each cut may, in turn, be divided into a number of fields 302 (for reasons of simplicity, field division is only shown for Cut 1 and Cut 3). Then, the fields may be searched for the existence of a pulldown pattern 303. In FIG. 3, a 2:3 pulldown is detected in Cut 1, which is then removed from the cut 304, resulting in a cut which is reduced in size 305.

Here fields B1 and D2 306 are identified as having been added by a previous 2:3 pulldown, and are therefore removed in the final sequence 305.

A 2:3 pulldown detection can be accomplished by classifying each frame of the cut and further searching for an occurrence of a repeated pattern of frame type sequence. Classification of frames can include comparing the fields of each frame with fields of the previous frame in the sequence and identifying the frame as either a black frame (0), new frame (1), incremental frame (2), repeated frame (3), transition frame (4), repeated top field only (5), or repeated bottom field only (6). As an example, if a 2:3 pulldown sequence, defined by pattern "A1A2, B1B2, B1C2, C1D2, D1D2" is present in the sequence, a repeated pattern of frame types 2, 2, 5, 2, 6 is detected. Classification of frames to the above mentioned types is accomplished by comparing the fields from both frames ordered as pairs in various combinations. For example, since the field B1 in frame B1C2 is identical to the field B1 in the previous frame B1B2, that frame is classified as a "repeated top field only" frame. Furthermore, the comparison of a field pair may include computing differences in a histogram as well as differences in the set of features. A value between 0.0 and 1.0 can be assigned to indicate complete dissimilarity to a complete similarity. In one embodiment, a classification algorithm based on a multi-layer neural network may be used. Other embodiments may use other classification algorithms based on either support vector machines, or decision trees or other suitable classification methods.

The example procedure may process each cut in which a pulldown pattern was detected, removing the fields added by the pulldown process. The cuts may be processed in any order, such as, without limitation, left to right, right to left, or random. Also, in some example embodiments, in order to avoid unnecessary processing, after each cut is processed, the resulting new total frame length of the full sequence can be recomputed. If that length is already smaller than the target length, additional cuts may not be processed, even if those cuts contain pulldown patterns.

In summary, if the procedure starts with a video sequence V (consisting of a sequence of cuts $C_n$):

$$V=\{C_1, C_2, C_3 \ldots C_x\}, \text{ where } \text{len}(V)=n \text{ frames}$$

After the first cut is identified, and reverse pulldown is applied on it:

$$V'=\{C'_1, C_2, C_3 \ldots C_x\}, \text{ where } \text{len}(C'_1) \leq \text{len}(C_1), \text{ and therefore } \text{len}(V') \leq \text{len}(V)$$

After the next cut is identified, and reverse pulldown is applied on it:

$$V''=\{C'_1, C'_2, C_3 \ldots C_x\}, \text{ where } \text{len}(C'_2) \leq \text{len}(C_2), \text{ and therefore } \text{len}(V'') \leq \text{len}(V')$$

The example process may repeat until either all cuts are processed, or the length of the transformed video sequence is equal to or smaller than the desired length.

If the resulting video sequence is not reduced to the desired length by application of the reverse pulldown procedure, an example procedure, according to one embodiment, may next reduce the length of the sequence by using interpolation to combine two subsequent frames into one frame that represents the same content.

The example procedure may scan the video sequence in order to identify frames which may be combined. For example, the process may scan each frame starting at the beginning of the video sequence and working towards the end, identifying individual pairs of frames which may be combined, e.g., based on their similarity exceeding some threshold, and combining those frames. Alternatively, the process may rank all pairs of frames (i.e., all pairs of frames appearing sequentially in the sequence) in the sequence on how closely they resemble one another, choosing the pair with the highest resemblance for interpolation into a single frame. Such a process may then continue by combining the next closest match, or re-ranking all pairs of frames in the resulting stream.

In addition, in order to ensure that interpolations are evenly spread throughout the sequence, some example procedures may identify interpolation pairs on a cut by cut basis. It is noted that although the interpolation process is described as occurring after reverse pulldown is complete, both portions of the procedure may also be performed concurrently, or as needed. For example, as explained above, the procedure may divide the sequence into cuts; and for each cut, the pair of frames that most closely resembles one another may be identified, and combined. The procedure may be repeated for each cut in the sequence, either until all cuts have been processed or until the resulting sequence has been reduced to the target length. If all cuts are processed without having reached the desired length, the procedure may begin again, etc. In addition, in some examples, pairs occurring at the end of a cut may be favored for interpolation, as the information lost by interpolation is generally less user perceptible at the end of a clip (versus at the beginning).

Figure 4:
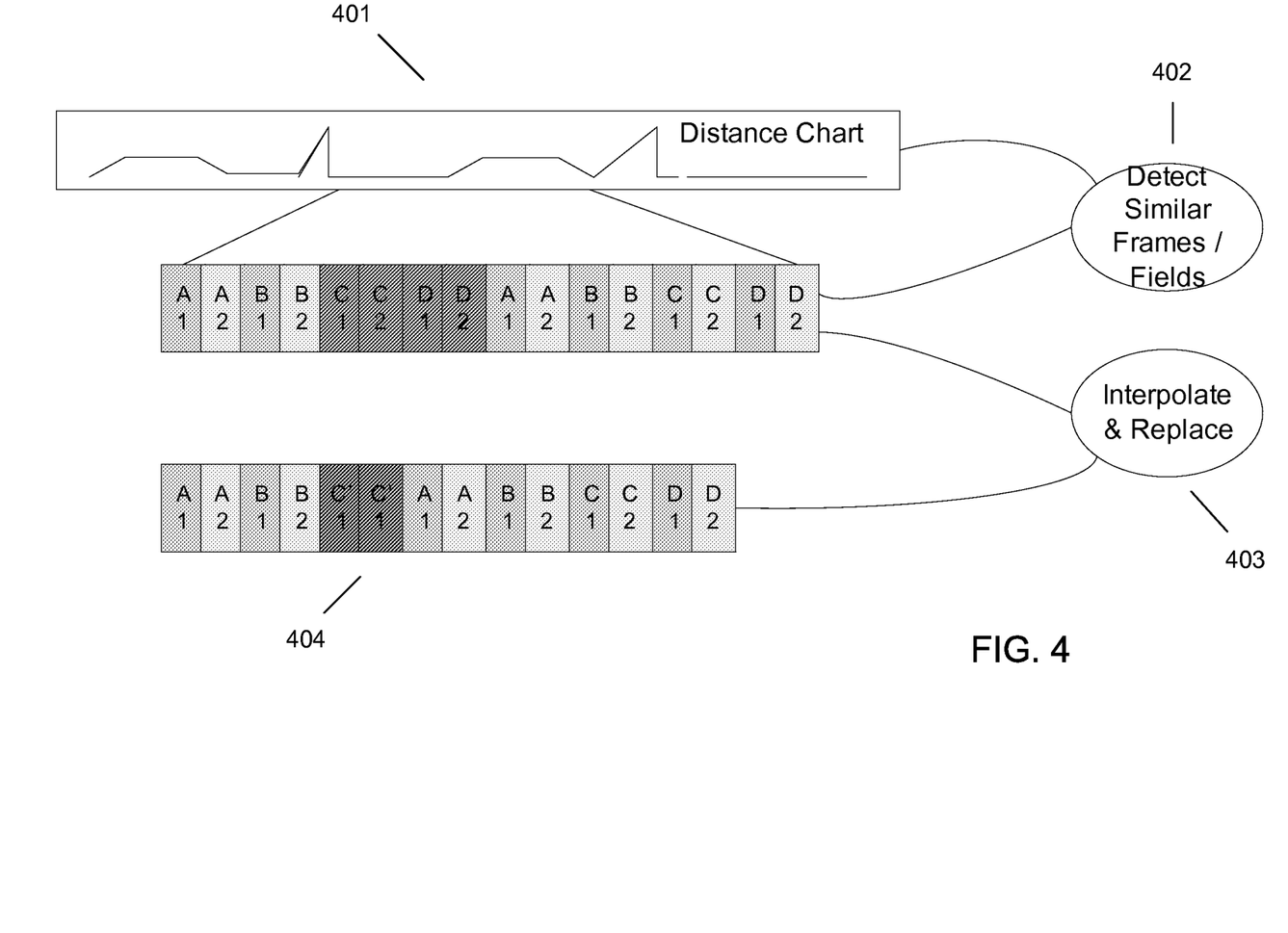
FIG. 4 illustrates an example procedure in accordance with an example embodiment of the present invention.

FIG. 4 illustrates the application of interpolation to a video sequence. In some example procedures, the displacement numbers 401 described above may again be used to identify frames for interpolation. As explained above, a high displacement number indicates a large change between subsequent frames, while a small number indicates less change. Where a pair of frames is detected 402 that are sufficiently similar, frames C and D as shown in the example, those frames may be interpolated 403, merging them into a single frame C'. Thus, in the resulting sequence 404, the two identified frames may be replaced with one new frame. The new frame may be created using any reasonable technique. For example, the individual pixels of each frame may be averaged together resulting in new pixels. Many other techniques may also be applied.

As above, some example procedures may re-compute the length of the sequence after every interpolation. If the length of the sequence is equal to, or less than, the desired length, the procedure may end without performing additional interpolations. Accordingly, an example procedure may begin with a video sequence V (consisting of a sequence of frames):

$$V=\{F_1 \ldots F_{i-1}, F_{i+1} \ldots F_n\|, \text{where } \text{len}(V)=n \text{ frames}$$

The procedure may then identify a pair of frames for interpolation, using any of the techniques described above, and may combine those frames. After the first interpolation has been applied:

$$V'=\{F_1 \ldots F_{i-1}, F_{(i)+(i+1)}, F_{i+2} \ldots F_n\}, \text{where } \text{len}(V')=n-1 \text{ frames}$$

The procedure may continue until either all matching subsequent frames are interpolated, or the length of the transformed video sequence is equal to, or smaller than the desired length.

In some example procedures the length of the resulting sequence may then be checked. The resulting time-compressed video sequence may be exactly equal to the target length, or it may be shorter than the target length. Should the time-compressed sequence be shorter than the target length, example procedures may then apply a pulldown technique to increase the length of the sequence to exactly, or nearly exactly, meet the target length. In such example procedures, the pulldown pattern will depend on the length of the video sequence in relation to the target length.

For example, if the length of the time-compressed video sequence is 720 frames (24 seconds at 29.97 fps), and the target length is 810 frames (27 seconds), then a pulldown needs to be applied to stretch every 8 input frames into 9 output frames. If a sequence of 8 input frames is represented as: A1A2 B1B2 C1C2 D1D2 E1E2 F1F2 G1G2 H1H2, then one possible solution would be to create the following series of frames: A1A2 B1B2 C1C2 D1D2 D2E1 E1E2 F1F2 G1G2 H1H2. Similarly, if the length of the time compressed video sequence is 720 frames (24 seconds), and the target length is 840 frames (28 seconds), then a pulldown would need to be applied to stretch every 6 input frames into 7 output frames. Again, if a sequence of 6 input frames is represented as: A1A2 B1B2 C1C2 D1D2 E1E2 F1F2, then one possible solution would be to create the following sequence: A1A2 B1B2 C1C2 C2D1 D1D2 E1E2 F1F2.

Figure 5:
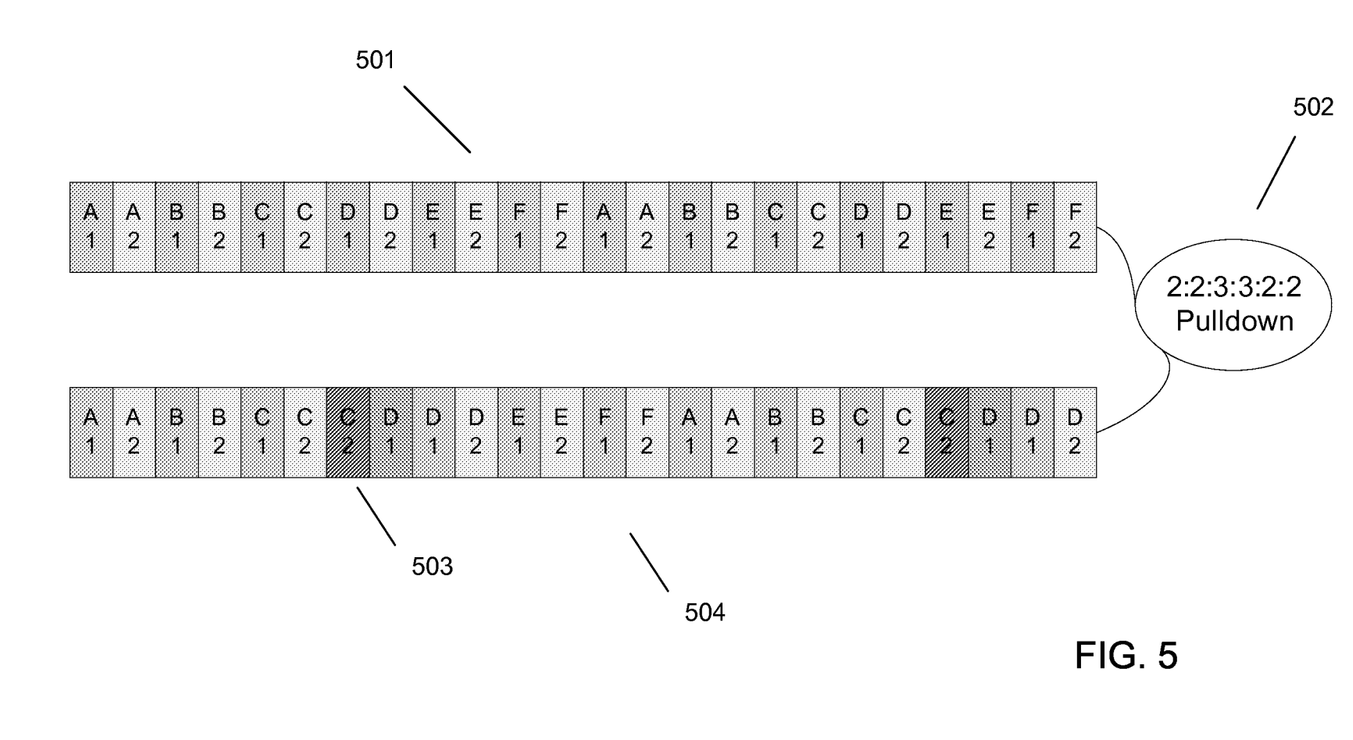
FIG. 5 illustrates an example procedure in accordance with an example embodiment of the present invention.
Figure 6:
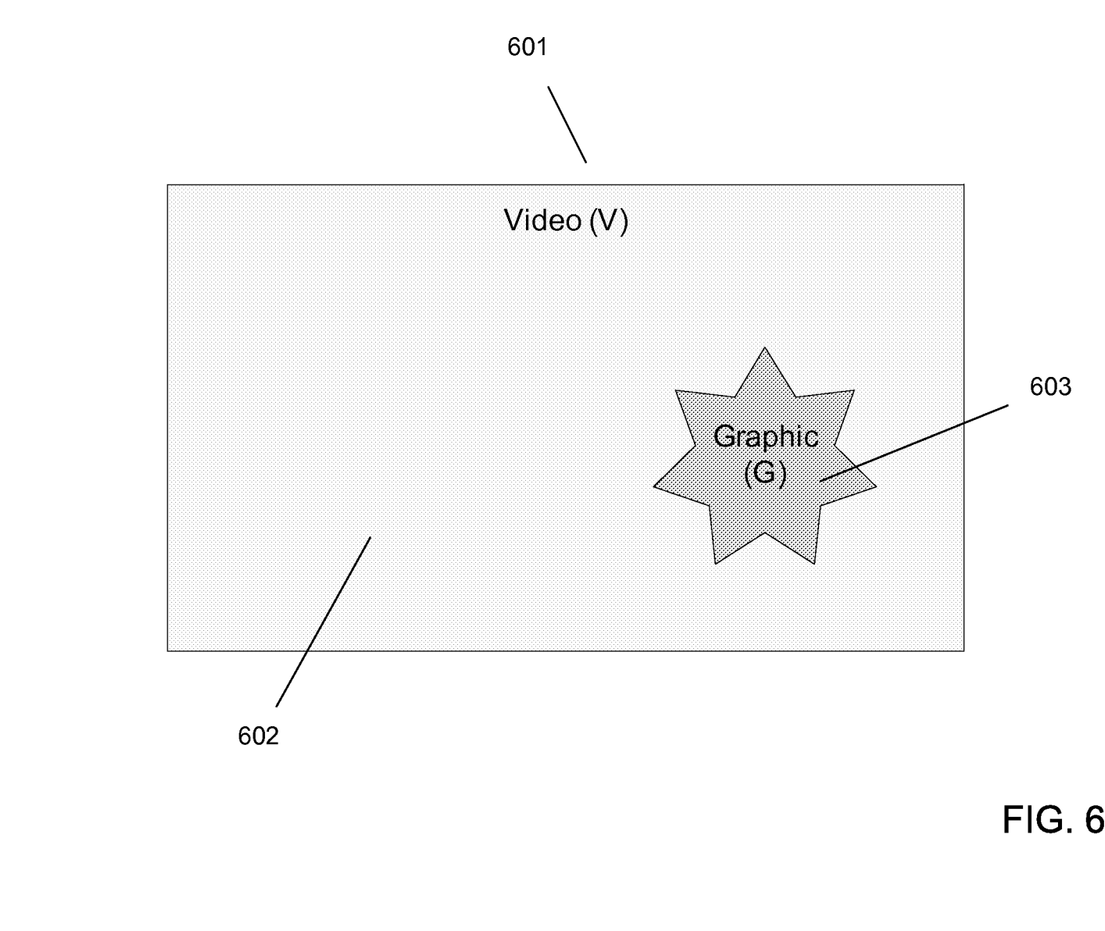
FIG. 6 illustrates an example video screen in accordance with an example embodiment of the present invention.
Figure 7:
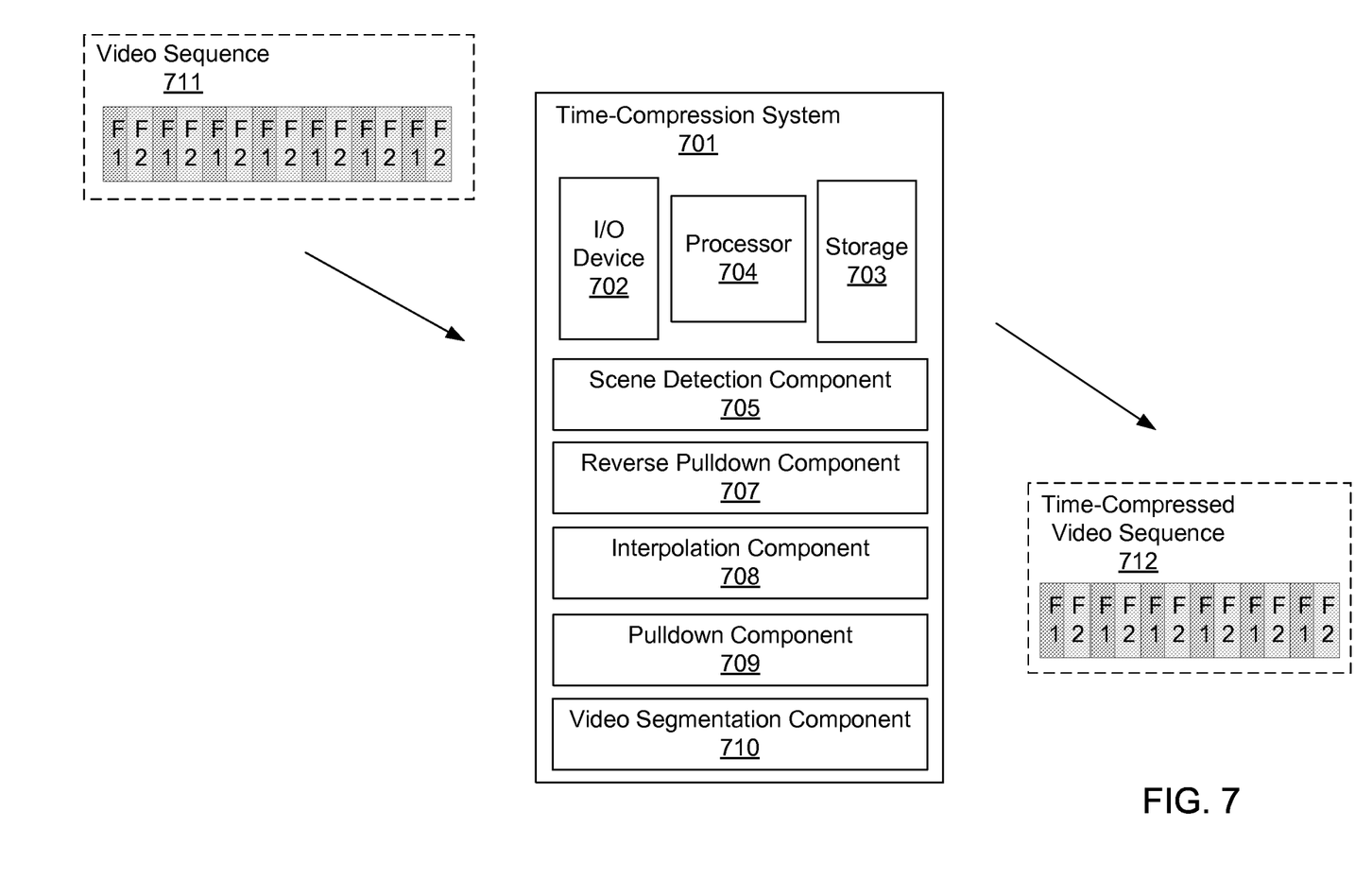
FIG. 7 illustrates an example system in accordance with an example embodiment of the present invention.

For example, FIG. 5 illustrates the application of a pulldown. In FIG. 5 the length of the time-compressed video sequence 501 may be 24 seconds, which may be shorter than the target length which may be 28 seconds. Therefore, a pulldown 502 may be applied to "stretch" the sequence to the desired length. In order to go from 24 seconds to 28 seconds, one extra frame must be created for every six frames in the sequence. In FIG. 5 a group of six frames is represented as the sequence A1A2 B1B2 C1C2 D1D2 E1E2 F1F2. For every such sequence a new frame is created 503, in the example the frame C2D1, and inserted into the final sequence. 504.

In summary, some example procedures may produce a time-compressed video sequence V (consisting of a sequence of frames):

$$V=\{F_1, F_2, F_3, \ldots F_n\}, \text{where } \text{len}(V)=n \text{ frames, and } m=\text{target length, and } n<m$$

The present invention may be embodied in may different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed:

1. A method comprising:
   receiving a sequence of frames of commercial content associated with a first time duration;
   determining a second time duration for insertion of the commercial content into a content stream, wherein the first time duration is longer than the second time duration;
   removing one or more frames, from the sequence of frames of commercial content, that were added based on a pulldown pattern, to compress the sequence of frames of commercial content; and
   causing output of the compressed sequence of frames of commercial content during the second time duration.

2. The method of claim 1, further comprising:
   determining one or more frames of the sequence of frames of commercial content that were added based on the pulldown pattern.

3. The method of claim 1, further comprising:
   determining a displacement value for each frame of the sequence of frames of commercial content.

4. The method of claim 3, wherein the displacement value indicates a difference in color or position between each frame of the of frames of commercial content and one or more previous frames in the sequence of frames of commercial content.

5. The method of claim 1, further comprising:
   dividing, based on one or more displacement values in the sequence of frames of commercial content exceeding a threshold, the sequence of frames of commercial content into a plurality of scenes.

6. The method of claim 5, wherein the removing comprises:
   dividing the plurality of scenes such that each scene of the plurality of scenes has at most one pulldown pattern.

7. The method of claim 1, further comprising:
   determining that the compressed sequence of frames of commercial content is less than the second time duration; and
   executing a pulldown process to augment the compressed sequence of frames of commercial content to match the second time duration.

8. The method of claim 1, wherein the removing is based on at least one of: a neural network, a support vector machine, or a decision tree.

9. A device comprising:
   one or more processors; and
   memory storing instructions that, when executed by the one or more processors, cause the device to:
     receive a sequence of frames of commercial content associated with a first time duration;
     determine a second time duration for insertion of the commercial content into a content stream, wherein the first time duration is longer than the second time duration;
     remove one or more frames, from the sequence of frames of commercial content, that were added based on a pulldown pattern, to compress the sequence of frames of commercial content; and
     cause output of the compressed sequence of frames of commercial content during the second time duration.

10. The device of claim 9, wherein the instructions, when executed by the one or more processors, further cause the device to:
    determine one or more frames of the sequence of frames of commercial content that were added based on the pulldown pattern.

11. The device of claim 9, wherein the instructions, when executed by the one or more processors, further cause the device to:
determining a displacement value for each frame of the sequence of frames of commercial content.

12. The device of claim 11, wherein the displacement value indicates a difference in color or position between each frame of the of frames of commercial content and one or more previous frames in the sequence of frames of commercial content.

13. The device of claim 9, wherein the instructions, when executed by the one or more processors, further cause the device to:
dividing, based on one or more displacement values in the sequence of frames of commercial content exceeding a threshold, the sequence of frames of commercial content into a plurality of scenes.

14. The device of claim 13, wherein the removing comprises:
dividing the plurality of scenes such that each scene of the plurality of scenes has at most one pulldown pattern.

15. The device of claim 9, wherein the instructions, when executed by the one or more processors, further cause the device to:
determining that the compressed sequence of frames of commercial content is less than the second time duration; and
executing a pulldown process to augment the compressed sequence of frames of commercial content to match the second time duration.

16. The device of claim 9, wherein the removing is based on at least one of: a neural network, a support vector machine, or a decision tree.

17. A non-transitory computer-readable medium storing instructions that, when executed, cause:
receiving a sequence of frames of commercial content associated with a first time duration;
determining a second time duration for insertion of the commercial content into a content stream, wherein the first time duration is longer than the second time duration;
removing one or more frames, from the sequence of frames of commercial content, that were added based on a pulldown pattern, to compress the sequence of frames of commercial content; and
causing output of the compressed sequence of frames of commercial content during the second time duration.

18. The non-transitory computer-readable medium of claim 17, wherein the instructions, when executed, further cause:
determining one or more frames of the sequence of frames of commercial content that were added based on the pulldown pattern.

19. The non-transitory computer-readable medium of claim 17, wherein the instructions, when executed, further cause:
determining a displacement value for each frame of the sequence of frames of commercial content.

20. The non-transitory computer-readable medium of claim 19, wherein the displacement value indicates a difference in color or position between each frame of the of frames of commercial content and one or more previous frames in the sequence of frames of commercial content.

* * * * *